United States Patent Office

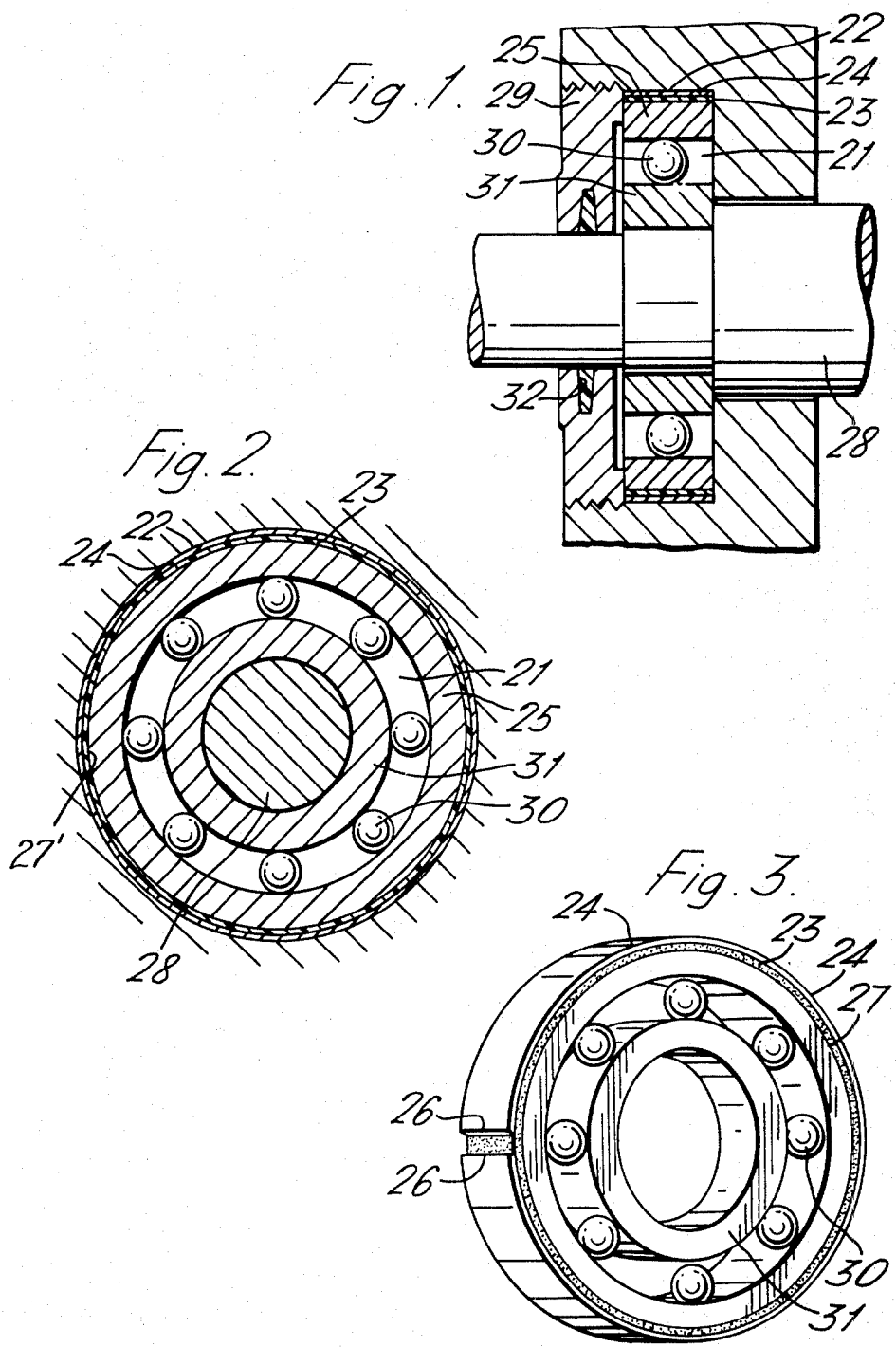

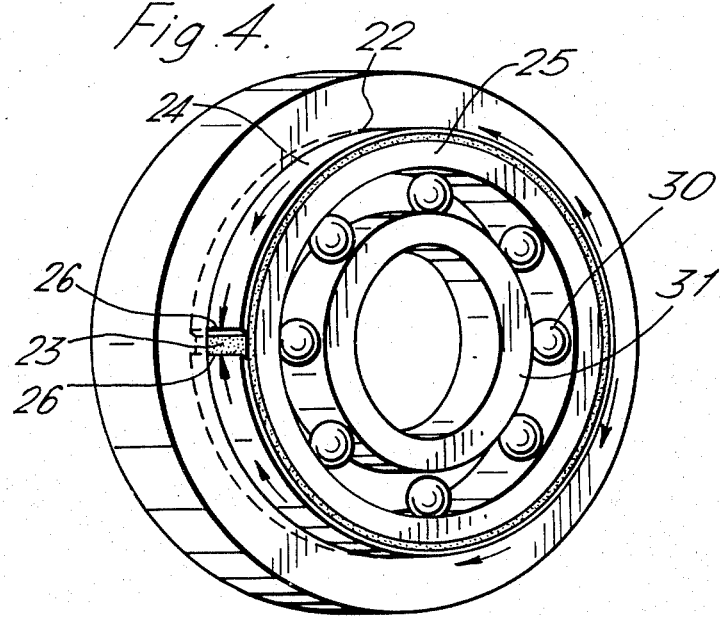
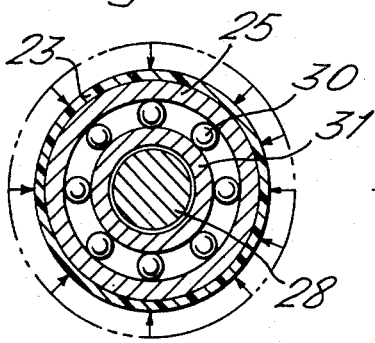
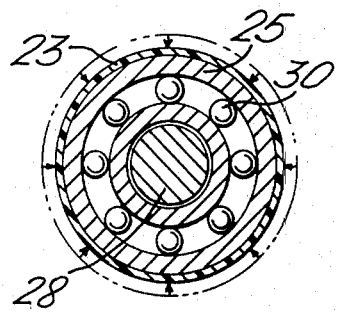

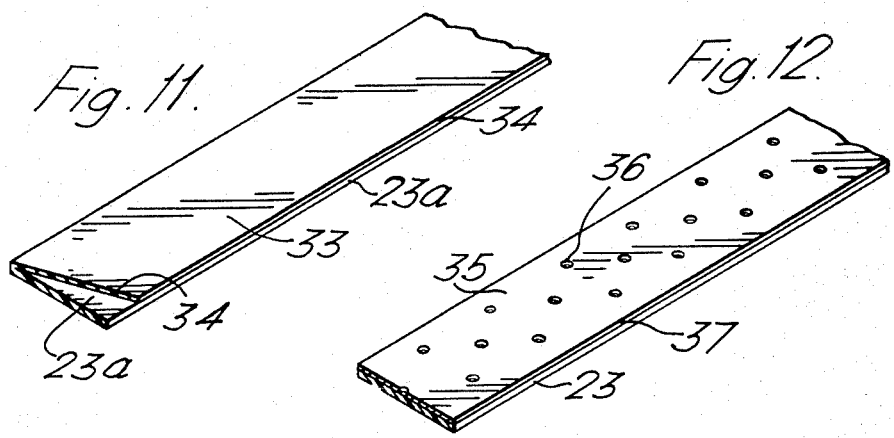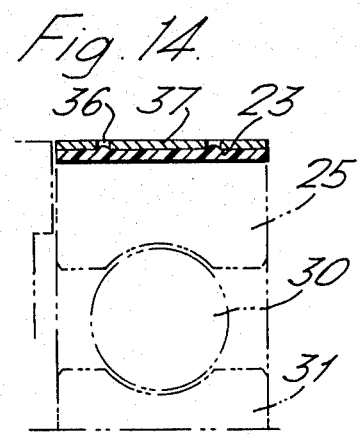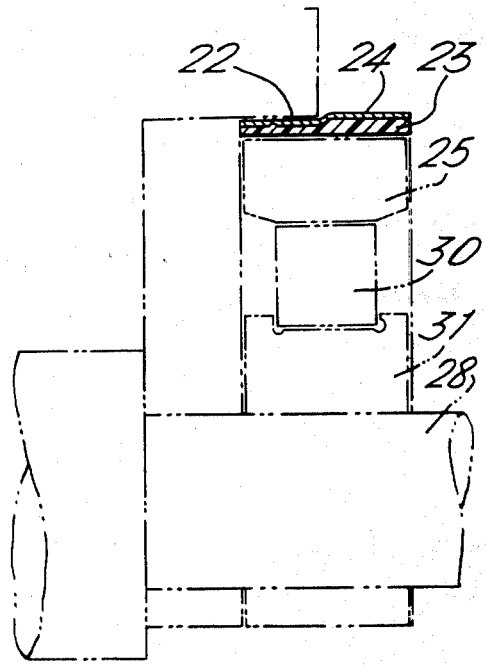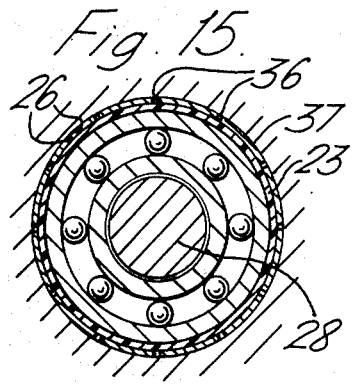

3,672,734
Patented June 27, 1972

3,672,734
BEARING ADAPTOR
Sigeru Bando, Tokushima, Japan, assignor to Bando Kiko Co., Ltd., Tokushima, Japan
Filed July 23, 1970, Ser. No. 57,531
Claims priority, application Japan, Oct. 10, 1969, 44/80,819; Feb. 3, 1970, 45/11,195; Feb. 10, 1970, 45/13,374; Feb. 18, 1970, 45/16,388; Feb. 20, 1970, 45/17,193; May 20, 1970, 45/49,895; May 23, 1970, 45/50,366
Int. Cl. F16c 35/06
U.S. Cl. 308—26
4 Claims

ABSTRACT OF THE DISCLOSURE

The bearing adaptor comprises an elastic body adapted to be secured on the outer peripheral surface of the bearing and a rigid elastic sleeve adhered on the outer peripheral surface of the elastic body, said sleeve being terminated at opposite ends thereof so as to define any clearance between said both ends.

---

This invention relates to a bearing adaptor.

Some of bearings are radial called ball bearings. Such bearings are consisted of an outer and an inner races and a plurality of steel balls or rollers rotatably inserted between the races, and are adapted to support a rotating shaft of the machine by means of rolling contact. For locating radial ball bearings in bearing housing to support therein, the seat diameter of the housing bearing is usually made a little larger than outer diameter of the outer race so that the bearing is movable along the axis thereof.

However, it is to be important that the outer race of the bearing is pressed into firm engagement with the bearing housing where vibrations at a high speed, heavy load or shocks are likely to happen. Especially, in case such precise operation of the machine is desired, interference fit between the outer race and the bearing housing should be applied.

On the other hand, according to increasing turning speed of the bearing, frictional temperature of rolling members of the bearing is produced, and heat of the temperature when increased causes thermal expansion of the bearing. Such expansion is substantially arised at faced sides of the races so as to reduce the distance between inner and outer races, because no space is provided between the outer surface of the outer race and the inner surface of the housing and between the inner surface of the inner race and the outer surface of the shaft.

Thus, big frictional resistance and high temperature which are undesirable for such rotation of the shaft are generated in the bearing. So it will be understood that when interference fit is applied to locate the bearing in the bearing housing, it is impossible to operate at a high speed, and clearance fit is unsuitable for precise operation use.

It is an object of this invention to provide a new bearing adaptor which spontaneously eliminates heavy rolling loads and high temperature which result from thermal expansion of the bearing during operation, thereby being capable of co-operating the bearing with the shaft at a high speed with accuracy.

Most disadvantages of a conventional bearing unit come mainly from incapability of adequate treatment of the thermal expansion.

Besides load-carrying side of the outer race is susceptible of irregularity of the bearing housing seat when the outer race is closely fitted onto the seat, and the irregularity also causes deformation of the outer race, thereby producing big frictional resistance and abrasion.

In essence, this invention contemplates a bearing adaptor having means to accommodate and regulate thermal expansion and deflection of the bearing.

In preferred embodiment of this invention such means comprises an elastic body secured on the outer peripheral surface of the bearing and a sleeve adhered on the outer peripheral surface of the body. The elastic body has many characteristics which are inherently possessed in this invention, because the elastic body is provided in the bearing housing so that a big initial pressure previous to operation is given to it while pressing the bearing in the bearing housing with the bearing adaptor.

Due to the initial pressure, the elastic body is made so hard that the bearing does not much suffer from displacement thereof forced by such harsh loads as heavy cutting resistance of a lathe or a mill.

The elastic body, however, is capable of reducing vibrations due to its elasticity, and when it is heated after the operation, a binding agent substantially made of gum substance will be solved and the elastic body being in free contact with the outer race and the sleeve.

Therefore, the elastic body will slip a little along the outer race and support the bearing with a comparatively constant and equal pressure all over the contacting surface of the outer race owing to visco-elasticity of the elastic body, this results in reforming the outer race into an exact roundness, so that centering of the bearing may be performed owing to the balanced forces.

It is observed in the operation that smooth and long run of the bearing is performed precisely at a wide selection of speed, especially at high speed which is recently the most consideration.

It is further object of the present invention to provide an improved bearing adaptor construction in the bearing housing in which long running is performed smoothly and precisely at wide selection of speed without overheating and abrasion on any conditions such as heavy loads and a high temperature of surroundings.

Accordingly, a further object of the present invention is to provide a novel bearing adaptor construction having all of the advantages and benefits of the above mentioned construction.

It is a further object of the present invention to provide such a bearing adaptor which may be easily adapted for conventional bearing installation and which is capable of being manufactured economically.

Other objects and advantages of the invention will appear from the following disclosure of preferred embodiments taken in connection with the attached drawings, in which:

FIG. 1 is an axial sectional view of a preferred embodiment which has been selected to illustrate the present invention in use with a conventional radial ball bearing;

FIG. 2 is a sectional view taken along the line 2—2 in FIG. 1;

FIG. 3 is a perspective view of the bearing adaptor with bearing;

FIG. 4 is a perspective view similar to FIG. 3, but showing fitting process of a unit of the adaptor and the bearing into the housing;

FIGS. 5 and 6 are diagrammatic views illustrating the effect of centering of the bearing by means of the bearing adaptor;

FIGS. 11 and 12 are side elevation views or segments of tape according to the present invention;

FIG. 13 is an axial sectional view of a prepared embodiment in use with a roll bearing;

FIG. 14 is an axial sectional view showing details of the tape shown in FIG. 12 when used as a bearing adaptor; and FIG. 15 is a sectional view of a bearing and a tape.

Figure 7:
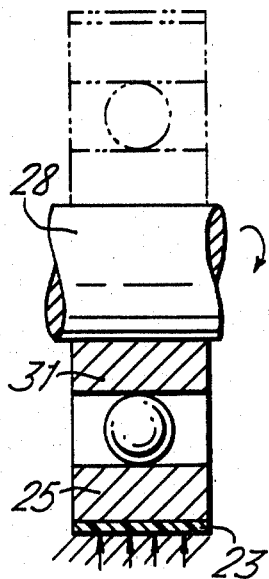
FIGS. 7, 8 and 9 are diagrammatic views illustrating comparatively the state of the bearing adaptor in use.

Referring to FIG. 1, a shaft 28 driven by a suitable source (not shown) is supported by the bearing housing 22 of a suitable machine by means of a radial ball bearing 21 including inner and outer races 25, 31 and a plurality of rolling members 30 of steel balls rotatably inserted between the races.

Between the outer race 25 and the bearing housing 22, there is a bearing adaptor which substantially consists of an elastic body 23 and spring steel plate 24 adhered on the outer surface of the elastic body by binding agent 27. The elastic body 23 is preferably made of raw or synthesis gum or highly polymerized compound such as polystyrene and is stuck on the outer race 25 with a binding agent 27' of gum substance. The outer surface of the sleeve 24 is adapted to be adjacent to the inner surface of the housing 22. Width of the elastic body 23 and the spring steel plate 24 are the same as that of the outer race 25 as shown in FIGS. 2 and 3.

The elastic body in use is perfectly sealed with the inner surface and the vertical surface of the bearing housing 22, the outer surfaces of the outer race 25 and one vertical surface of a seal ring 29 having an oil seal 32.

Referring to FIG. 2, it will be understood that the bearing adaptors substantially consist of said elastic body 23 and sleeve 24.

In the above description of FIGS. 1 and 2, outline of a bearing adaptor of the invention will be seen, substantially like what it is composed. However, in this invention the bearing adaptor has a special feature of fitting as shown in FIGS. 3 and 4 so that the bearing performs an ideal operation on any conditions, even if dimensions of the bearing 21 and temperature are changed in accordance with its operation.

Referring to FIGS. 3 and 4, particularly in FIG. 3, the sleeve 24 has a clearance when placed on outer race with the body so formed that end portions 26, 26 of the sleeve do not contact each other to define any clearance therebetween.

In FIG. 4, the end portions 26, 26 approach very closely while being pressed into the bearing housing 22, because dimensions of elements of the bearing adaptor are minutely designed as follows.

Uniform thickness of the elastic body is selected in a range of 0.4 mm. to 2.0 mm. and that of the sleeve 24, in a range of 0.1 mm. to 0.2 mm. Relative measure is made so that two times of total thickness of employed sleeve and elastic body at its elastic limit plus outer diameter of the bearing is equal to the inner diameter of the bearing housing, and amount of collapse (which means of reduced amount of thickness of the elastic body, when the force is applied thereon) of the elastic body 13 when the unit made of the bearing adaptor and bearing is pressed into the bearing housing 22, is $3/100$ mm. to $15/100$ mm. whereby initial pressure of the elastic body is 500 kg./cm.$^2$ to 1000 kg./cm.$^2$.

These figures described above are given in consideration of advantages of installation and compromising point considering solidity of the elastic body 23 in order to perform a precise operation, and elasticity in order to control thermal expansion or vibration.

It is found from the results of experiments that thickness of the elastic body is preferably 0.4 mm. to 2.0 mm. in practice in order to make the largest elasticity at a small collapse, through the thinner the elastic body, the larger elastic forces are obtained at the same amount of collapse of the elastic body.

Effect for protecting the bearing from vibrations will be reduced where an elastic body below 0.4 mm. is employed.

On the contrary, when the elastic body of thickness above 0.2 mm. is employed, it will take much time to locate it in the bearing housing due to overlapping or waving of the elastic body, and a very thick elastic body has no effect of resisting against displacement due to shocks from the shaft.

Preferable amounts of collapse of the elastic body when 0.4 mm. to 2.0 mm. of thickness is employed, is about 5% of the original thickness of the body in order to perform a precise operation at a large elasticity with a comparatively small amount of collapse of the elastic body, whereby the unit may be easily installed in the bearing housing.

Thickness of the sleeve 25 is selected in a range of 0.1 mm. to 0.2 mm. so that its deformation due to elasticity is preferable for pushing the unit into the bearing housing.

The end portions 26 of the sleeve 24 approach gradually to each other while pushing it into the bearing housing owing to its easiness for slipping and deformation of the elastic body 23 whereby an easy installation is obtained.

Initial pressure of the elastic body may be selected in a range of 500 kg./cm.$^2$ to 1000 kg./cm.$^2$, since a big initial pressure above the range is effective for keeping the bearing an exact roundness or stable, but easiness for the installation of the unit described above will be lost.

Referring now to FIGS. 5 and 6, the elastic body and the binding agent of the bearing adaptor, change their situations by temperature owing to frictional resistance and heat conduction from a shaft 21 during its operation. Such temperature causes to solve the binding agent between the sleeve 24 and the outer race 25.

The elastic body 23 is capable of being slid along the outer surface of the body 23 to balance the outer forces whereby elastic force of the body automaticaly centers the bearing to the axis of the rotating shaft supported by the bearing as shown in FIG. 6. Such effect as pushing the bearing to a right place of center of gyration of the shaft owing to visco-elasticity of the body is inherently possessed by this invention.

In the present invention, since the body of viscoelasticity material is inserted between the outer race 25 of the bearing and the rigid sleeve, unbalanced forced applied on to the sleeve is absorbed and balanced within the elastic body, and then balanced force is conducted to the outer peripheral surface of the outer race 25. So the bearing may be effectually supported by the rotating shaft at centering condition with the axis of the shaft.

Figure 8:
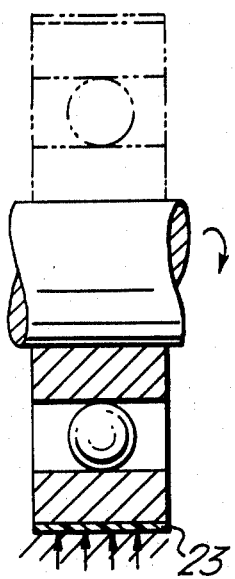
Figure 9:
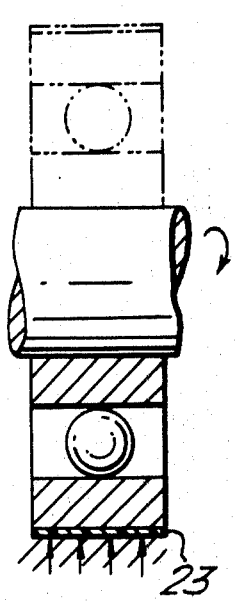
Figure 10:
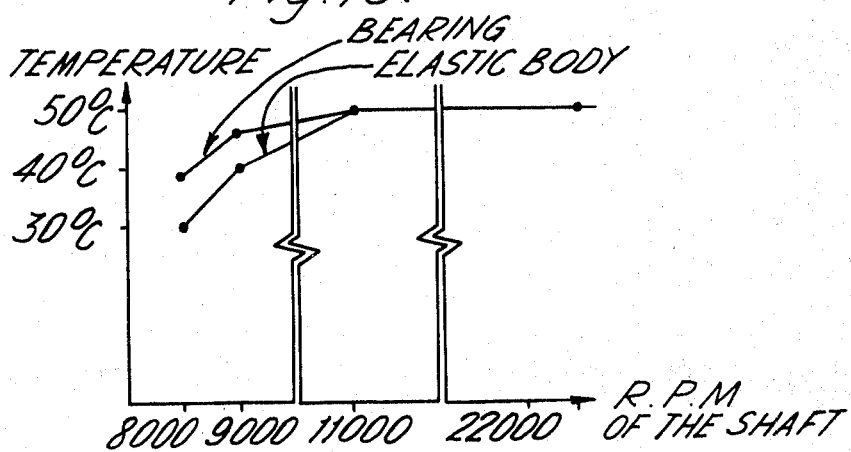
FIG. 10 is a chart showing the result of the table 1 which will later appear.

Referring to FIGS. 7, 8 and 9, three cases of situation of the unit are comparatively shown in which condition of the elastic body with thermal expansion of the bearing are illustrated. FIG. 7 shows first case of stop all components in the bearing housing wherein the elastic body is in equilibrium with its initial elastic stress made while installing a bearing in the bearing housing. FIG. 8 shows second case of a low speed revoluton in comparison with third case of a high speed as shown in FIG. 9.

The outer race 25 is here expanded in accordance with increment of velocity of rotation, in other words, due to increment of frictional temperature. Force due to thermal expansion of the races will overcome the resistance against deformation of the elastic body 23, this result in accommodating reasonably the expansion of the race. Thus rolling loads are kept substantially constant since increasing rolling resistance and frictional heat are excluded.

Furthermore, the outer race 25 contacting with the bearing housing without any clearance between the outer race and the housing will be sandwiched by a plurality of rolling members or balls and the elastic body 23 with big and uniform forces, thereby resulting the outer race into exactly round, reducing increment of temperature even at a high speed and making it possible to perform a precise operation for a long time without abrasion.

Based on the construction as described above, results of experiment on a radial ball bearing are shown in the following Table 1.

TABLE 1

| R.p.m. of the shaft | 8,000 | 9,000 | 11,000 | 22,000 |
|---|---|---|---|---|
| Lubricating material | Grease | Grease | Grease | Oil |
| Bearing temperature, °C | 38 | 45 | 50 | 50 |
| Bearing adaptor temperature °C | 30 | 40 | 50 | 50 |
| Thermal expansion of the outer race, mm | 7/1,000 | 10/1,000 | 20/1,000 | 20/1,000 |
| Operation performed | (1) | (1) | (1) | (1) |

1 Smooth.

NOTE: Used bearing: Single raw, radial ball bearing Type; BC (meteric dimensions) Bore diameter; 40 mm., Outside diameter; 80 mm., Width; 18 mm. Used bearing adaptor; Thickness; 1 mm., Amount of collapse when located in the bearing housing; 5/100 mm.

It is observed that comparatively high speed operation of 22,000 r.p.m. is performed as smoothly as that of 8,000 r.p.m.

Generally speaking, it is preferable for such high speed operation as 5,000 to 20,000 r.p.m. to use elastic body of 1 mm. where the elastic body is so hard as nitrilo-gum, and to give initial pressure of 900 kg./cm.$^2$. However, use of 2 mm. elastic body is available where heavy loads or shocks are likely to exist.

Especially, where the precise operation of machines is mostly desired, combination of 0.4 to 0.5 mm. thickness of the elastic body and the initial pressure above 900 kg./cm.$^2$ is preferable.

Following Tables 2, 3 and 4 show the results of experiment to perform a desirable operation when nitrilo-gum of Shore's hardness number 60 to 80 is used as the elastic body.

TABLE 2

| Bore diameter (mm.) | Accuracy of operation | Thickness of the elastic body (mm.) | Collapse of the elastic body (mm.) | Initial pressure (kg./cm.$^2$) |
|---|---|---|---|---|
| 18 to 50 | Superior | 0.4 to 0.5 | 2.2/100 to 2.5/100 | 920. |
|  | Moderate | do | 3/100 to 5/100 | 520 to 920. |
| 80 to 120 | Superior | 0.4 to 0.5 | 5/100 | 920. |
|  | Moderate | do | 3/100 to 5/100 | 520 to 920. |
| 180 to 250 | Superior | 0.7 to 0.8 | 3.5/100 to 4/100 | 520 to 920. |
|  | Moderate | 1.5 | 7.5/100 | Above 900. |
| 250 to 315 | Superior | 1.0 | 5/100 | Above 900. |
|  | Moderate | 2.0 | 10/100 | Do. |
| 315 to 500 | Superior | 2.0 | 10/100 | Above 900. |
|  | Moderate | 2.0 | 10/100 | Do. |

TABLE 3

| R.p.m. of the shaft | Thickness of the elastic body (mm.) | Collapse of the elastic body (mm.) | Initial pressure (kg./cm.$^2$) |
|---|---|---|---|
| 500 | 1.5 | 3/100 to 7.5/100 | 520 to 920. |
| 1,000 | 1.0 | 3/100 to 5/100 | 520 to 920. |
| 5,000 | 1.0 | 5/100 | Above 900. |
| 10,000 | 1.0 | 5/100 | Above 900. |
| 20,000 | 1.0 | 5/100 | Above 900. |

It is found from results of experiments shown in Table 2, Table 3 and Table 4 that thickness of the elastic body may be preferably selected in a range of 0.4 to 2.0 mm., and that initial pressure given while setting should be preferably 500 kg./cm.$^2$ to perform the most ideal operation of most machinery.

Referring now to FIG. 11, another embodiment of the adaptor is shown in which a segment of a tape 33 is consisted of comparatively a soft elastic body 23A and a hard elastic body 34 having smooth surface, and is manufactured in the form of long tape so that it is easily used as a bearing adaptor.

In this embodiment, the hard elastic body applied for adaptor sleeve instead of spring steel plate 24 as illustrated in the first embodiment is formed of non-conductor material of electricity.

Various combination of many kinds of elastic bodies such as polystyrene, polyethylene, polypropylene, cyclone-gum at times with such fibres as synthetic, kemp, metallic or glass, polycarbonate and such resins, as acetal, fluorine, polyamide, phenol and epoxy, are available, and it is convenient to combine few kinds of elastic body without a binding agent because it is possible to easily combine with heat.

Referring to FIG. 12, a segment of a tape 37 consisting of an elastic body 23C and a sleeve 35 of porous spring steel plate having plurality of holes is shown.

Use of it as a bearing adaptor is effective for placing it in the bearing housing without trail or protruding backwards of the elastic body 23, because these holes 35 prevent relative slip of sleeve 35 and the elastic body as shown in FIG. 14.

Referring to FIG. 15, the tape 37 in use as a bearing adaptor is shown where clearance about 0.5 mm. between end portions 26A of the tape 37 is left.

What I claim is:

1. A bearing adaptor for mounting a radial ball bearing provided with outer and inner races having opposite side edges and radial balls in a bearing housing, a generally cylindrical inner elastic member surrounding the outer surface of said outer race, a generally cylindrical outer rigid elastic member surrounding the inner elastic member, the outer rigid elastic member being interrupted and having a pair of spaced-apart ends, each of the inner elastic member and the outer rigid elastic member having opposite side edges located above the corresponding opposite side edges of the outer race, the thickness of the inner elastic member being in the range of about 0.4 mm. to about 2.0 mm., the inner elastic member and outer rigid elastic member being adhered to each other by a heat-soluble binding agent so that when the binding agent is heated during operation of the bearing the binding agent is melted and the inner elastic member is in free contact with the outer race and the outer rigid elastic member.

2. The bearing adaptor of claim 1 wherein the rigid elastic member has a plurality of small holes.

TABLE 4

| Load condition | | Use | Thickness of the elastic body (mm.) | Collapse of the elastic body (mm.) | Initial pressure (kg./cm.$^2$) |
|---|---|---|---|---|---|
| Outer race is in rotative | Heavy loads and shocks | Tension pulley | 2.0 | 10/100 | Above 900. |
|  | Light loads | Pulley or conveyor | 1.0 | 5/100 | 500 to 900. |
| Directions of loads are unstable | Heavy shocks | Main motor of an electric car | 0.5 to 1.0 | 2.5/100 to 5/100 | Above 900. |
|  | Moderate loads and precise operation | Turbo compressor | 0.4 to 0.5 | 2/100 to 2.5/100 | Do. |
|  | Moderate loads | Pump motor | 1.0 | 5/100 | 500 to 900. |
| Inner race is in rotative | Shock loads | Rail way vehicle | 2.0 | 10/100 | Above 900. |
|  | Moderate loads and precise operation | Grinder spindle | 0.4 | 2/100 | Do. |
|  | Moderate loads | Gear box | 1.0 | 5/100 | 500 to 900. |
|  | Variable loads where precise operation is requested. | Main shaft of machine tools | 0.4 | 2/100 | Do. |

3. A bearing adaptor for mounting a radial ball bearing provided with outer and inner races having opposite side edges and radial balls in a bearing housing, a generally cylindrical inner elastic member surrounding the outer surface of said outer race, a generally cylindrical outer rigid elastic member surrounding the inner elastic member, the outer rigid elastic member being interrupted and having a pair of spaced-apart ends, each of the inner elastic member and the outer rigid elastic member having opposite side edges located above the corresponding opposite side edges of the outer race, the thickness of the inner elastic member being in the range of about 0.4 mm. to about 2.0 mm., the inner elastic member and the outer race being adhered to each other by a heat-soluble binding agent so that when the binding agent is heated during operation of the bearing the binding agent is melted and the inner elastic member is in free contact with the outer race.

4. The bearing adaptor of claim 3 wherein the inner elastic member and the outer rigid elastic member is made in the form of an elongated tape applied to the outer race.

References Cited

UNITED STATES PATENTS

| | | | |
|---|---|---|---|
| 3,528,712 | 9/1970 | Vacca et al. | 308—26 |
| 2,141,145 | 12/1938 | Wooler et al. | 308—26 |
| 2,193,549 | 3/1940 | Chamberlin | 308—26 |
| 3,263,907 | 8/1966 | Nimwegen et al. | 308—26 X |
| 2,700,581 | 1/1955 | Migny | 308—236 |

FOREIGN PATENTS

| | | | |
|---|---|---|---|
| 110,318 | 1964 | Czechoslovakia | 308—236 |

MARTIN P. SCHWADRON, Primary Examiner

B. GROSSMAN, Assistant Examiner

U.S. Cl. X.R.

308—189, 2—36